G. E. BATES.
DIRECTION INDICATOR FOR MOTOR VEHICLES.
APPLICATION FILED AUG. 27, 1919.

1,364,172.

Patented Jan. 4, 1921.
2 SHEETS—SHEET 1.

INVENTOR.
George E. Bates
BY
Parsons & Bodell
ATTORNEYS.

G. E. BATES.
DIRECTION INDICATOR FOR MOTOR VEHICLES.
APPLICATION FILED AUG. 27, 1919.
1,364,172.
Patented Jan. 4, 1921.
2 SHEETS—SHEET 2.
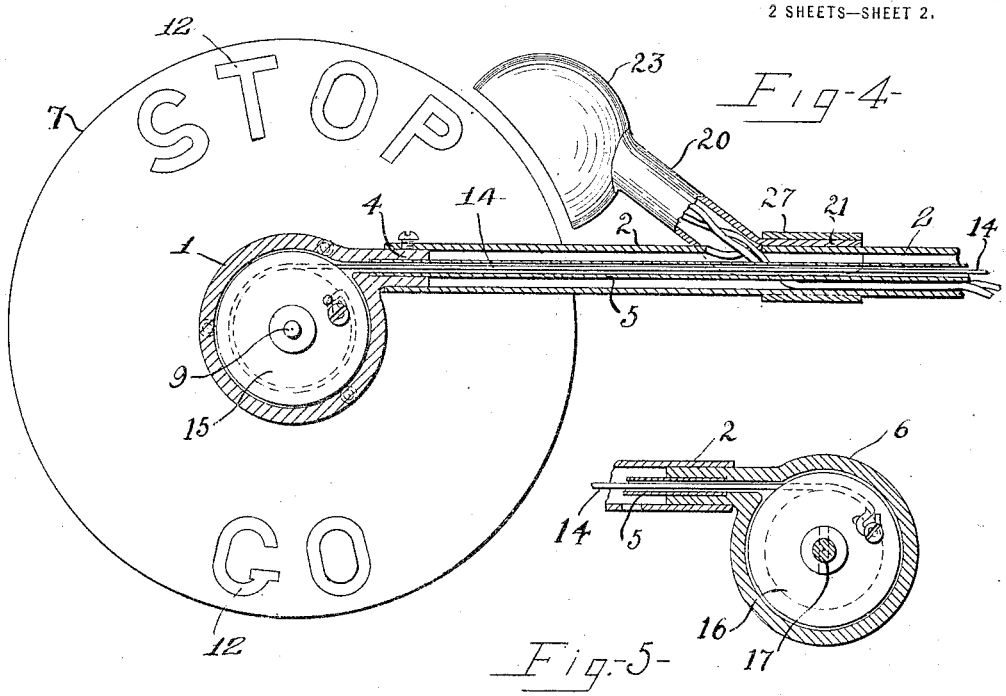
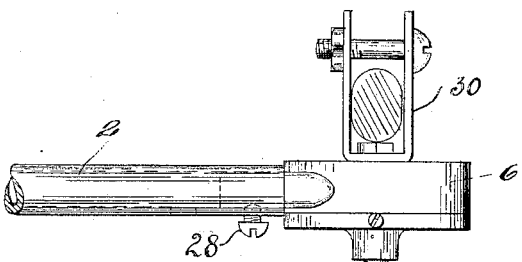
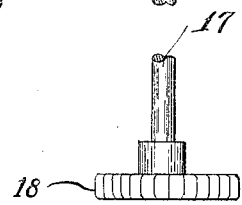
INVENTOR.
George E. Bates
BY Parsons & Bodell
ATTORNEYS.

UNITED STATES PATENT OFFICE.

GEORGE E. BATES, OF SYRACUSE, NEW YORK.

DIRECTION-INDICATOR FOR MOTOR-VEHICLES.

1,364,172.         Specification of Letters Patent.         Patented Jan. 4, 1921.

Application filed August 27, 1919. Serial No. 320,081.

*To all whom it may concern:*

Be it known that I, GEORGE E. BATES, a citizen of the United States, and a resident of Syracuse, in the county of Onondaga and State of New York, have invented certain new and useful Direction-Indicators for Motor-Vehicles, of which the following is a specification.

This invention relates to direction indicators for motor cars which is particularly simple and economical in construction, is readily applied to the vehicle and is readily visible from both the front and the rear of the vehicle, and the invention consists in the novel features and in the combinations and constructions hereinafter set forth and claimed.

In describing this invention, reference is had to the accompanying drawings in which like characters designate corresponding parts in all the views.

Fig. 4 is a fragmentary sectional view, partly in elevation taken on line 4—4, Fig. 3.

Fig. 5 is a fragmentary vertical sectional view through the case inclosing the pulley of the handle and contiguous parts.

Fig 6 is a plan view of parts seen in Fig. 5.

Figure 1:
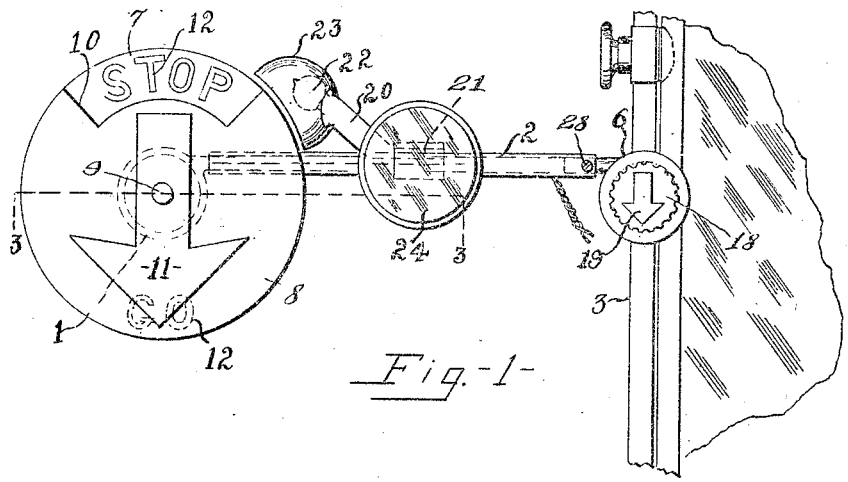
Figure 1 is an elevation of my direction indicator, the same being shown as applied to the windshield of a motor vehicle.
Figure 2:
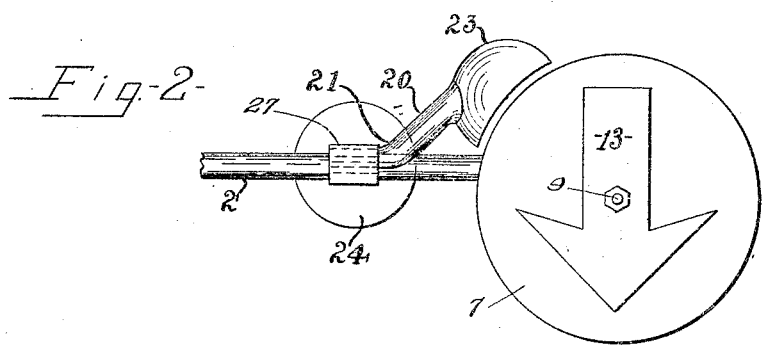
Fig. 2 is an enlarged fragmentary front elevation thereof.
Figure 3:
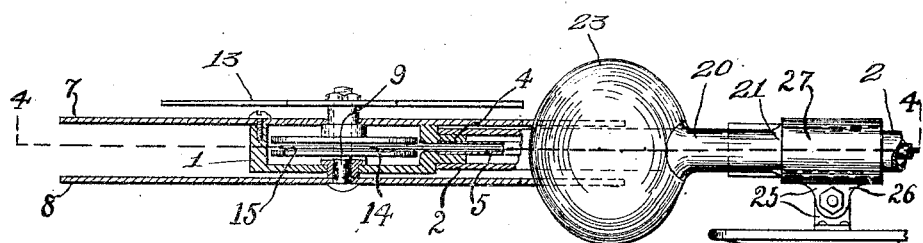
Fig. 3 is an enlarged horizontal sectional view taken on line 3—3, Fig. 1.

This direction indicator comprises generally, a support for attachment to any convenient part of the vehicle, two members arranged one in front of the other, one member being formed with a cutout and the other having a signal character thereon and one of said members being movable relatively to the other to bring the cutout and the signal character into registration whereby said character is visible through the cutout and out of registration whereby the character is concealed, and the movable member also having a pointer or arrow, and means for actuating the movable member into different positions.

The support may be of any suitable form, size and construction and comprises a body 1 having suitable means, here illustrated as a laterally extending arm 2, for connection to the side iron or frame 3 of the windshield of the vehicle. The support may however be provided with other means for attachment to any other part of the vehicle.

The body 1 is here shown as in the form of a hub open at one side and having a laterally or tangentially extending hollow nipple 4 in which is mounted a tube 5 and on which is mounted a tube which forms the arm 2, the tubes 2 and 5 being similarly attached to the nipple of a hub or casing 6 with which the handle is associated as will be hereinafter described.

7 and 8 are respectively the two members, and in the illustrated embodiment of my invention, the member 7 is a background member and is fixed to the body 1 of the support on the open side thereof, and the member 8 is mounted on a shaft or arbor 9 journaled in the support, this member 8 being located on the opposite side of the body to that on which the background plate 7 is located. The members 7 and 8 are preferably discoidal in general form and the member 8 is formed with a marginal cutout 10 and also with an indicator or arrow 11 thereon and the background plate 7 is provided on the rear side thereof or on the front side thereof with respect to the point of view of the observer with one or more signal characters 12 as the word "Stop" or "Go," the member 8 being movable by the rotation of the shaft 9 to bring the cutout 10 into registration with the words "Stop" or "Go" to make the same visible to the observer through the cutout and to cover said words "Stop" or "Go" by the marginal portion of the member 8 to conceal the words "Stop" or "Go." A pointer as an arrow 13 is mounted upon the end of the shaft 9 opposite to that on which the member or disk 8 is mounted.

The shaft 9 is rotated or moved about its axis by any suitable means, here shown as a push and pull cable or wire 14 extending through the arm 2 and through the tube 5 and winding on one end of a pulley 15 mounted on the shaft 9 within the hub or body 1 and at its opposite end on a similar pulley 16 mounted on the shaft 17 of the casing 6, the shaft 17 having a suitable handle or knob 18 thereon by means of which it is turned in one direction or the other. The table or wire 14 slidably fits the tube 5 and is prevented from buckling by the tube 5. Hence, upon turning of the handle 18 in one direction as to the left, the cable 14 is pushed through the tube 5 and turns the pulley 15, shaft 9, the arrow 13 and disk 8 in one direction, that is to the left and upon the operation of the handle 18 to the right, the cable or wire 14 is pulled to the right and winds the cable on the pulley 16 and unwinds it from the pulley 15. This handle may be provided with a suitble indicator or arrow 19 thereon which occupies a position corresponding to that of the arrow 13 and indicator 11 on the disk 8.

When the driver of a motor vehicle intends to stop, he turns the handle until the arrow 19 points downwardly, this movement positioning the arrow 13 to point downwardly and also rotating the disk 8 so that the indicator 11 thereon points downwardly and the cutout 10 comes into registration with the word "Stop" on the background plate 7.

When the driver of the vehicle intends to turn to the right, he turns the knob or handle 18 until the arrow thereon points to the right and this positions the arrow 13 and the disk 8 so that the indicator 11 thereon points to the right and the word "Stop" is covered by the margin of the disk 8. To turn to the left, the operation is substantially the same but in the reverse direction.

To go straight ahead, the handle is turned until the arrows 19, 13 and 11 point upwardly. In this position, the cutout 10 uncovers the word "Go."

Means for illuminating the indicator at night is provided and in the illustrated form of my invention I have shown a single lamp arranged to illuminate both the front face of the background plate 7 and face of the disk 8.

20 designates a lamp bracket having a base flange 21 mounted on the arm 2 and secured thereto as presently described, the bracket carrying a suitable socket at its outer end for the lamp 22 and also carrying a light reflector 23, the light reflector extending far enough forwardly and rearwardly to project the light so that the arrow 13 is clearly visible at night.

Also a suitable mirrorscope 24 may be mounted on the arm 2 and adjustable along the same and at different angles, it being connected to the arm 2 by a universal joint 25 which permits such adjustment. The part 26 of such joint which part is mounted on the arm 2, is formed with a hub 27 on the arm and the base flange 21 of the lamp bracket extends into the hub and is clamped thereby on the arm 2. This hub may be a split clamp or may be of one piece sleeve held in position by a set screw.

The arm 2 is also connected to the case 6 by an adjustable joint which permits the arm 2 to be so adjusted that the disks 7 and 8 are arranged in vertical planes irrespective of the slant of the windshield. As illustrated, the arm is movable about the axis of the nipple of the case 6 and is held in its adjusted position in any suitable manner as by a set screw 28.

The case here illustrated is secured to the windshield by a clamp 30.

This direction indicator is particularly advantageous in that it is clearly visible at all times from front or rear of the vehicle.

A suitable housing may be provided around the edges of the disks 7, 8 but owing to the construction of the hub 2 which is practically watertight and weather-proof no housing is necessary.

What I claim is:

1. A direction indicator for motor vehicles including front and rear back ground disks arranged in vertical transverse planes so as to face forward and rearward and be disposed at all times to view from the front and rear, one of the disks being stationary and the other being movable about its axis, an indicator appearing on the latter disk and movable therewith, a pointer movable over the face of the stationary disk, and means for operating the pointer and the movable disk.

2. A direction indicator for motor vehicles including front and rear back ground disks arranged in vertical transverse planes so as to face forward and rearward and be disposed at all times to view from the front and rear, one of the disks being stationary and the other being movable about its axis, and having a marginal cut out portion arranged to expose a portion of the stationary disk to display a signal in a predetermined position, of a movable disk, an indicator appearing on the latter disk and movable therewith, a pointer movable over the face of the stationary disk, and means for operating the pointer and the movable disk.

3. A direction indicator for motor vehicles including front and rear movable indicating members mounted for rotary movement and operating in vertical transverse planes so as to face forward and rearward and be disposed at all times to view from the front and rear, the rear indicating member having a marginal cut out portion, a stationary plate or member arranged between the said movable members and bearing at its rear face, a signal arranged to be exposed by the cut out portion of the rear member in a predetermined position of the latter and means for operating the movable members.

In testimony whereof, I have hereunto signed my name, at Syracuse, in the county of Onondaga, and State of New York, this 11th day of August, 1919.

GEORGE E. BATES.